United States Patent [19]

Hardy et al.

[11] Patent Number: 5,203,705
[45] Date of Patent: Apr. 20, 1993

[54] WORD SPELLING AND DEFINITION EDUCATIONAL DEVICE

[75] Inventors: George P. Hardy, Pelham Manor, N.Y.; David McWherter, Bensalem, Pa.; Gregory J. Winsky, Medford, N.J.

[73] Assignee: Franklin Electronic Publishers, Incorporated, Mt. Holly, N.J.

[21] Appl. No.: 443,114

[22] Filed: Nov. 29, 1989

[51] Int. Cl.⁵ ............................................. G09G 19/00
[52] U.S. Cl. .................................... 434/169; 434/167; 364/419
[58] Field of Search ................. 434/167, 169; 364/419

[56] References Cited

U.S. PATENT DOCUMENTS

| | | | |
|---|---|---|---|
| 4,308,017 | 12/1981 | Laughon et al. | 434/335 |
| 4,411,628 | 10/1983 | Laughon et al. | 434/335 |
| 4,421,487 | 12/1983 | Laughon et al. | 434/169 |
| 4,749,353 | 6/1988 | Breedlove | 434/169 |
| 4,830,618 | 5/1989 | David | 434/169 |
| 4,891,775 | 1/1990 | McWherter | 434/169 |

Primary Examiner—Richard J. Apley
Assistant Examiner—Joe H. Cheng
Attorney, Agent, or Firm—McAulay Fisher Nissen Goldberg & Kiel

[57] ABSTRACT

An electronic spelling correcting machine compares input term against a list of terms in memory and validates spelling and provides a set of terms which may correspond to the input term if the input term is incorrect. The validated term or suggested term is provided with a locating indicia that permits the user to go to the page in a book where definition of the meaning of the word may be found. Various word games are incorporated. A user determined list may be substituted for the main list of terms in order to enable the user to practice word games and thus learn the words based on a selected list of terms of significance to the user. For purposes of game playing, the words incorrectly used from said user list are biased in such a fashion that they are picked in a quasi-random fashion so that the words played incorrectly are selected with greater frequency than the words played correctly.

18 Claims, 6 Drawing Sheets

WORD SPELLING AND DEFINITION EDUCATIONAL DEVICE

BACKGROUND OF THE INVENTION

The present invention relates to a word spelling and educational device and more particularly to such a device which is geared to help a child in learning to correctly spell words and to use a dictionary.

Learning to spell, entails skills similar to those used in learning to read and additionally requires frequent repetition of the words one is learning to spell. In learning to spell and use words it is helpful to know the definition of the word that you are spelling. Similarly, in learning the definition of a word it is important to know how to spell it.

Frequently children have problems in using dictionaries because they do not know the spelling of the word they are looking up. If the child is misspelling the word it is exceedingly difficult to find the word in a dictionary to ascertain its correct spelling and its definition. This tends to be a bigger problem for children than for adults since frequently a child's misspelling is further from the actual spelling of a word than an adult's may be and accordingly it is less likely that the correctly spelled word will be found by a scan of a few dictionary pages.

In teaching children to spell, as in teaching other things, it is helpful to make the learning process interesting and thus hold the child's attention. This technique has been used in many computerized and non-computerized ways over the years. Lessons are packaged in a game-type format so that the child is more enthused about the learning process. Additionally, different types of repetition have been used to help children learn in spelling. For example, flash cards are a tried and true method for helping children to learn spelling and other things. The use of a game format in an electronic hand-held learning aid to facilitate learning spelling is disclosed in U.S. Pat. No. 4,421,487 issued Dec. 20, 1983 to Laughlon and Philpott.

In designing a spelling aid device for children, it is useful to have the device verify correct spellings and to correct misspelled words by offering correctly spelled possibilities.

With the advent of personal computers there have been developed different computerized educational aids for children. These aids are very helpful but computers are expensive and they cannot be easily transported from place to place.

Spelling correctors that are hand held and portable are known in the art. Although these are very useful they are not specifically designed for children and are not adapted for learning games. Additionally the words that children learn vary from time to time and these known hand held cannot adapt to this changing list of words. Machines which contain dictionary definitions require additional memory and are thus more expensive.

Accordingly, it is an object of the present invention to provide a hand held electronic educational device which is specifically designed to be used by children learning to spell.

Another important object of this invention is to provide a device that will aid a child in making a transition from using machines that provide an answer to using reference works and in learning to look up a answer.

Further objects of the present invention are to provide such an electronic educational device which is relatively inexpensive and which can be used to play educational games.

Still a further object of this invention is to provide such a electronic educational device which can be customized to a particular child's needs.

A more specific object of this invention is to provide such an electronic educational device which interfaces with a printed dictionary to provide word definitions.

Applicant refers to co-pending application Ser. No. 199,060, now U.S. Pat. No. 5,113,340, filed in the United States Patent and Trademark Office on May 12, 1989 entitled Electronic Spelling Machine for a disclosure of the type of spelling correcting arrangement that is incorporated as part of the device of this invention. That patent application, together with U.S. Pat. No. 4,490,811 issued Dec. 25, 1984 and entitled String Comparator Device System Circuit and Method and U.S. Pat. No. 4,830,618 issued May 16, 1989 and entitled Electronic Spelling Machine, provides a sufficient disclosure of the spelling correction technology that is embodied in this invention so that such need not be repeated herein.

BRIEF DESCRIPTION OF THE DRAWINGS

FIG. 5 is a more detailed illustration of the decision step 52 of FIG. 4.

DESCRIPTION OF THE PREFERRED EMBODIMENT

Figure 1:
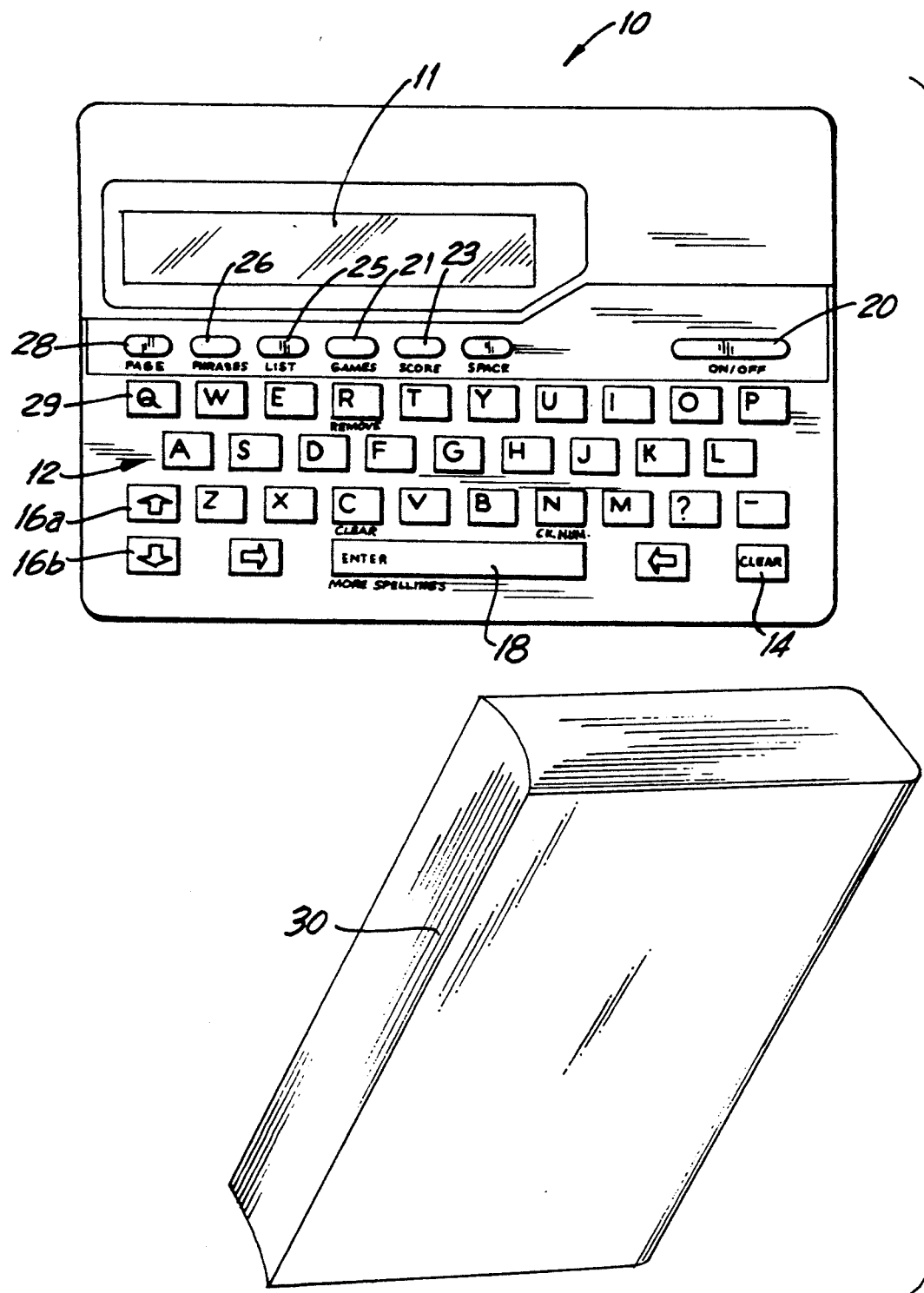
FIG. 1 is a perspective view of one device that embodies the arrangement and system of this invention.

Referring now to the drawings, the reference numeral 10 refers to the hand held electronic educational device of the present invention.

Device 10 is a self-contained, battery operated, portable device having an LCD character display 11 and keyboard 12.

Keyboard 12 has a lower portion which includes keys for the 26 letters of the alphabet; a clear key 14 which clears the display 11, an upwardly pointed arrow scroll key 16a and a downwardly pointed arrow scroll key 16b which permit the user to scroll back and forth through a variety of lists and menus; and an enter key 18 which the user actuates after an input word or input set of letters and indicia has been completed so that the device can perform the function selected. Keyboard 12 includes an on/off key 20 to activate and deactivate the device 10, a games key 21 to select the game playing mode of device 10, a score key 23, a list key 25 and a page key 28. The keys are discussed more fully hereinafter.

Device 10 is provided with a word list memory. Device 10 is also provided with a program which allows device 10 to compare input characters, which form a presumptive word, against the words in the memory list.

The technique for the spelling correcting functions are known to the art and a preferred embodiment of such may be found in the co-pending application Ser. No. 199,060 and the U.S. Pat. Nos. 4,490,811 and 4,830,618 mentioned earlier.

Associated with device 10 is a reference book 30. Although reference book 30 may be any reference book, in a preferred embodiment of the present invention associated reference book is "Webster's Illustrated Elementary Dictionary" published by Merriam Webster. The reference book 30 contains the definition of words. When a correctly spelled word is displayed on display 11, pressing the page key 28 will cause the page number in book 30 that contains the definition of the word displayed to be displayed on the screen next to the word.

Device 10 may be used in a spell correction mode which includes a number of sub-modes. To check the spelling of a word, a user turns on device 10 with key 20. Display 11 displays the phrase "Ready For Word". The user then types in a word using the alphabet character keys. The word is input into the device by pressing enter key 18. The device 10, through its memory, checks the spelling of the input word and if the word has been correctly spelled, a symbol such as a star or asterisk appears on the display 11. If the input word has not been correctly spelled, a word list is developed by the phonetic and typographic matching function in the machine. The user may scroll through the word list. The words on the developed list are ranked so that the closest spelling to the entered word is usually the first on the list of words developed by the device. If the input word cannot be matched by device 10 with a word in its memory, the display 11 will read "Sorry Can't Help". The user may then attempt again to spell the word.

While using device 10, display 11 gives the user instructions. For example, if a downward pointing arrow is displayed on display 11 this means that the user should press scroll key 16b to see more words or more information. Thus it is important for use to pay attention to the information appearing on display 11.

If the user has correctly spelled the word but still desires to see a developed word list he can so do by pressing enter key 18 again after the star indicating the correct spelling of a word has been displayed. This repressing of the enter key after the correct spelling is displayed generates an override function which treats the correctly spelled word as if it were not a valid word.

In a sub-mode of the spelling mode, the user can check the spelling of a word if he doesn't know one or more letters. The user types in the known alphabet characters. In lieu of alphabet character keys the user employs question mark key 31 for each unknown letter. Then the user proceeds as heretofore described by pressing the enter key to obtain a developed word list. The question mark key 32 may be used at any place in a word. The hyphen key 24 may be used to designate where one or more letters are unknown. Its use is analogous to the use of the question mark key 22. However, while the question mark key may be used in any position in the word, the hyphen key cannot be used for the initial portion of a word. The hyphen key 24 and question mark key 22 provide help for cross word puzzles as well as for spelling. In the embodiment disclosed herein, the user can not use both the hyphen and question mark with the same word. In the embodiment herein, one cannot use both hyphen and question marks with the sam word.

Key 26 is the phrases key and it is used as follows. If the user suspects that a word may be used in a phrase after the word is input, the phrases key 26 rather than the enter key 18 is depressed. Device 10 then develops a list with those phrases from the memory that have the input word. By way of example, if the user inputs the word "RED" and then depresses the phrase key 26 a set of words and phrases will be generated including "red corpuscle", "red blood cell" and "read between the lines".

A unique aspect of device 10 is its ability to work in an interactive mode with Webster's Illustrated Elementary Dictionary. This interactive mode uses page key 28. To use page key 28, a correctly spelled word must be shown on display 11. Page key 28 is then depressed and display 11 will show the page where the word is found in Webster's Elementary Dictionary. By turning to that page, the user can read the definition of the word. Any time a user wants to find a page number where a word can be found in the dictionary, the following steps are taken. The word is keyed in and the enter key depressed. Once the correctly spelled word is on display, the page key 28 is depressed. The user then need only open the dictionary and turn to an appropriate page to find the definition of the word.

Educational device 10 will provide a page reference to the definition of the primary form of a word if the word entered is a subentry or inflected form of the primary word in a dictionary. For example, if the word entered is "taller", the page reference will be to where the word "tall" is defined. The screen will show "503(i) tall". This indicates to the user to look under the word "tall" at page 503 for the definition of the word taller. Similarly if a plural form is entered, the page number that is provided will be for the singular form together with an indication that it is the singular form of the word to be reviewed. For example, if "dogs" is entered, and the page key is pressed, the screen will show "150(i) dog" indicating that the entered word is an inflected form of the word dog which is defined at page 150 of the dictionary. As another example, if the word "children" is entered and the page key pressed, the screen will show the entry "97(s) child" thereby indicating that the definition for the word children is a subentry under the word "child" appearing on page 87. This last example shows one of the advantages of the educational device 10 in that a user who is not aware of the relationship between the words "children" and "child" might have difficulty locating children in a dictionary even if there is no spelling problem. But, use of device 10 will direct the user to the right entry.

Another important aspect of device 10 is that it allows the user to create a personal word list and to then use that personal word list in the game modes which will be described hereinafter. Up to thirty words at a time can be input into the user's personal word list. That is particularly useful for children who can input words from their weekly school spelling list.

Figure 2:
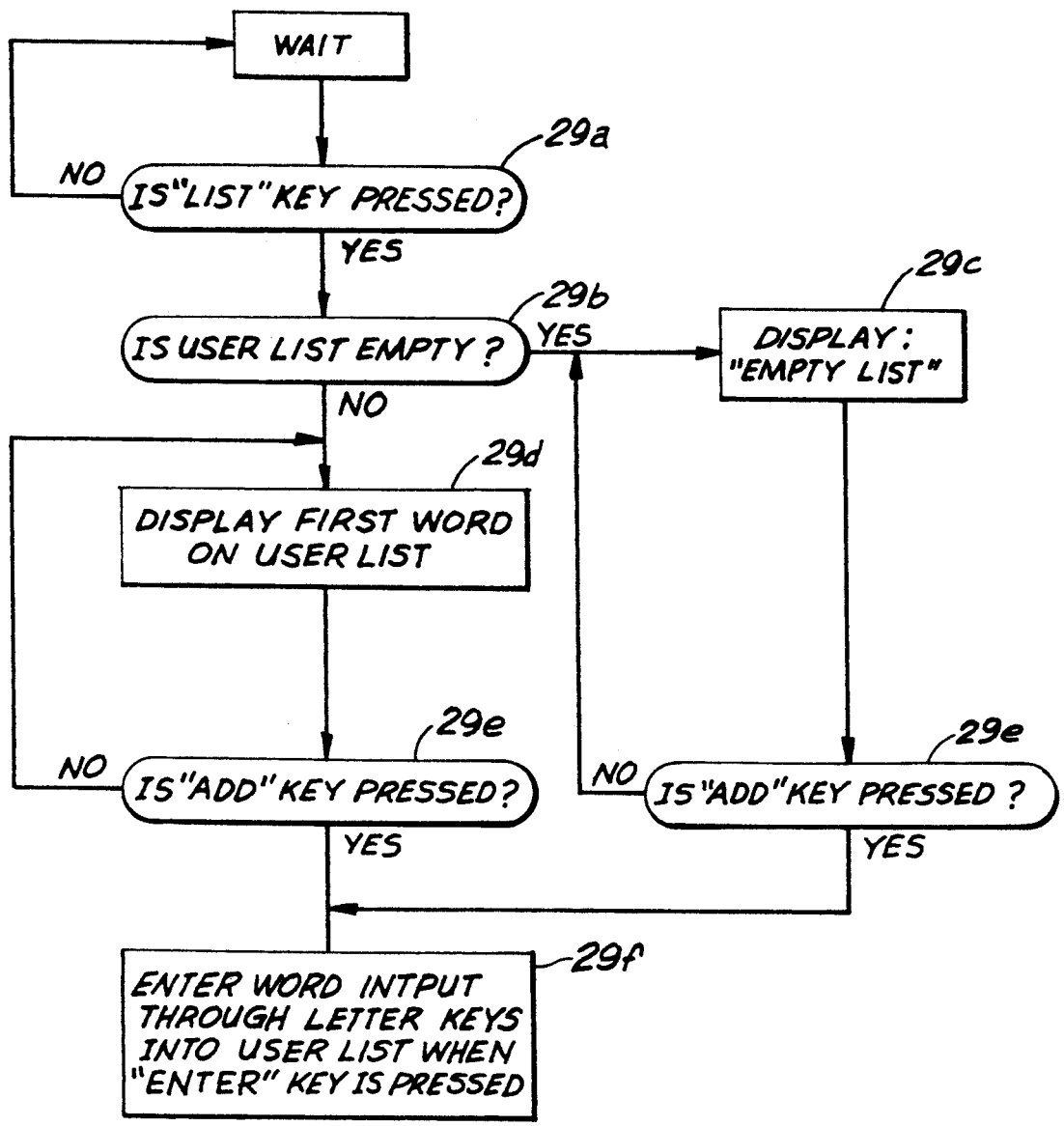
FIG. 2 is a flow chart illustrating the development of the user list. The user list is a list of words put into memory by the user to be employed in lieu of the main list of words in connection with various educational games embodied in the FIG. 1 device.

Words are added to the user list, as shown in FIG. 2, in the following manner. The device 10 is turned on by the key 20. The display 11 will then read "READY FOR WORD". Then if the user presses the list key 25

(decision step 29a) the display 11 will, depending on whether the user list is empty or not (decision step 29b) display either the legend EMPTY LIST or will display the first word on the user list; function steps 29c, 29d. If the user then presses the Add key 29 (decision step 29e) then the display will indicate LIST WORDS. The user then employs the alphabet character keys on the keyboard to create whatever word is desired and then if the Enter key is pressed (decision step 29f) the word is added to the user list and the display indicates the legend: O K WORD ADDED. The user can then repeat the process and add the number of words desired.

The entire user list may be cleared by depressing the "C" key after list key 25 has been depressed. As a safety check there is a confirming yes/no entry that is necessary to clear the entire user list. Also individual words may be removed from the list. The scroll keys are used until the word to be removed is shown on display 11 and then the "R" key is depressed to remove that word. The user list personalizes device 10. When words are in the user list, the user selects the user list in the game mode instead of the main list. The user list may include words from the main list as well as other words and/or names. When a word which is not in the main list is entered into a user list, the display 11 will tell the user that the word is not in the main list and asks the user to confirm the entry by pressing the "Y" key or to cancel the entry by pressing the "N" key.

Device 10 may be used in a game mode which includes a number of sub-modes. The game mode is entered by depressing games key 21 after "ready for word" appears on display 11. The name of one of the games in the game menu will then appear on display 11. By way of example, when the game key is depressed the word "flashcards", which is one of the games in the menu appears on display 11 along with a downwardly pointing arrow. The downwardly pointing arrow indicates that the scroll key 16b should be depressed to display the other games in the menu. Both scroll keys 16a and 16b can be used to scroll through the menu of games. In a preferred embodiment of the invention the following game sub-modes can be played with device 10: Flashcards, User Hangman, Hangman, Jumble and Wordblaster. When the name of the game that is to be played is shown on display 11 the user depresses enter key 18 and, depending upon the particular game sub-mode which has been chosen, a different series of steps must be performed.

Wordblaster can be played with either the user list or the main list. If there are words in the user list the player must choose which list to play by using the scroll keys and the enter key. If there are no words in the user list, no such choice is given and the game is played with the main list. After a list has been chosen by the player the player must choose a game speed between a slowest speed of "one" and a fastest speed of "ten". This is done using the scroll keys and the enter key. The player then chooses a word size of between three to fourteen characters using the scroll and enter keys. The game then begins. Letters in the word chosen by device 10 begin to appear on display 11 and when the player knows the word, the enter key 18 is depressed and the word guessed is typed in. If the player has correctly guessed, the word display 11 will read "You win". If not, display 11 will read "Wrong". The discussion of FIG. 6 further provides a more detailed description of this Wordblaster game.

Flashcards may be played with either the user list or the main list. After the list is chosen and a game speed of between 1 and 10 is chosen as heretofore described the game begins. A word from the chosen list briefly is shown on display 11. After the word is removed from the display, the prompt symbol ">" appears on the display. The player then types in the word which had been displayed and depresses the enter key 20. If the word has been spelled correctly display 11 reads "You Win". If not, display 11 reads "Wrong". To continue the game, the enter key 18 is then depressed.

User Hangman is a two player game. After the game is chosen, display 11 shows the phrase "Hangman Word? ". The first player then types in a word and depresses the enter key. The second player has a selected number of tries (for example fourteen) to guess the word by typing in letters one at a time. If he guesses the word within that number of tries, he wins.

Hangman is played using either the user list or the main list. After the game and list are selected, word size and number of tries are chosen using the scroll keys and the enter key. The player then guesses the word which has been chosen by learning aid 10 by inputting one letter at a time.

Jumble can only be played with the user list. Device 10 jumbles words from the user list and the player unjumbles the words to spell them correctly. After the game has been selected, the jumbled word appears on display 11 and when the player knows the word, he types it in and depresses the enter key. If the word is correct, display 11 reads "You win". If not, it reads "Wrong".

The score key 23 allows a player to see a score for each game. When score key 23 is depressed, the highest attainable score is indicated by P="X", where "X" represents a number. The individual players score is indicated by C="Y", where "Y" represents a number.

The various sub-modes make the learning experience interesting and exciting to the child. By providing spelling modes, game modes, and the option of a personal user list, device 10 is uniquely adapted for both learning and entertainment. Further, its use with associated reference book 13 allows it to provide more information at less cost.

When the personal user list is employed during any game sub-mode, words that are missed by the player are repeated with greater frequency than words which are not missed. This way, the child is tested more often on troublesome words.

Device 10 is provided with means to control the contrast of the display 11. By using scroll keys 16a and 16b when "Ready For Word" appears on display 11, the display can be made lighter or darker.

Device 10 is provided with an automatic shut-off means which assures that it will not be left on by mistake. This preserves the life of the batteries used with the device.

Figure 3:
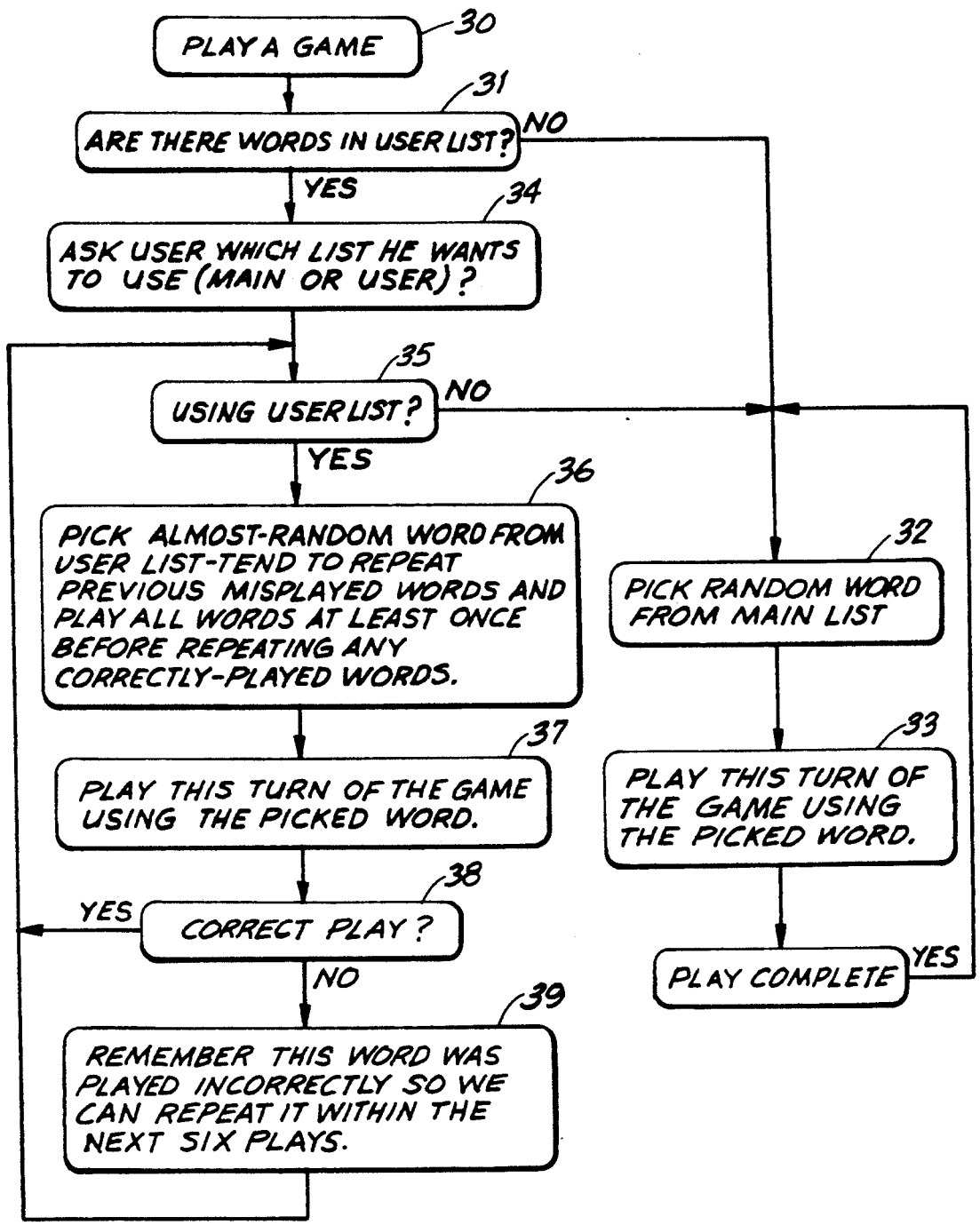
FIG. 3 is a flow chart illustrating the selection and employment of the user list in connection with a particular game.

FIG. 3 is a flow chart illustrating the selection of the user list or the main list when a game such as Wordblaster is to be played.

Function step 30 indicates that a game, any game, has been selected. If, as indicated at decision step 31 there are no words in the user list, then a word is picked at random from the main list as indicated at function step 32. The game is played using the random word so picked as indicated at function step 33.

But if there are words in the user list, the display shows a request for the user to indicate whether or not the main list or the user list is to be employed, function step 34. The user scrolls to "Main" or "User" on the display and selects which list by hitting the Enter key. If the user selects the user list, then the decision step 35 causes the system to proceed to function step 36. A word is picked from the user list in a fashion that is almost random. The word picked is biased toward words which have not been played correctly as indicated in greater detail in connection with the flow chart in FIG. 4.

After the turn of the game is played with the word from the user list, step 37, a determination is made at decision step 38 that the user has completed either a correct play or not. If the user has completed a correct play then the operation goes back to the point where the user list has been indicated as the list to be used and an appropriate word is picked from the user list and the next turn of the game is played. If the play of the turn of the game was not correct then, function step 39 tags the word in memory as one that has been played incorrectly and the function step 36 of picking the word is biased to repeat the word within the next six plays.

Figure 4:
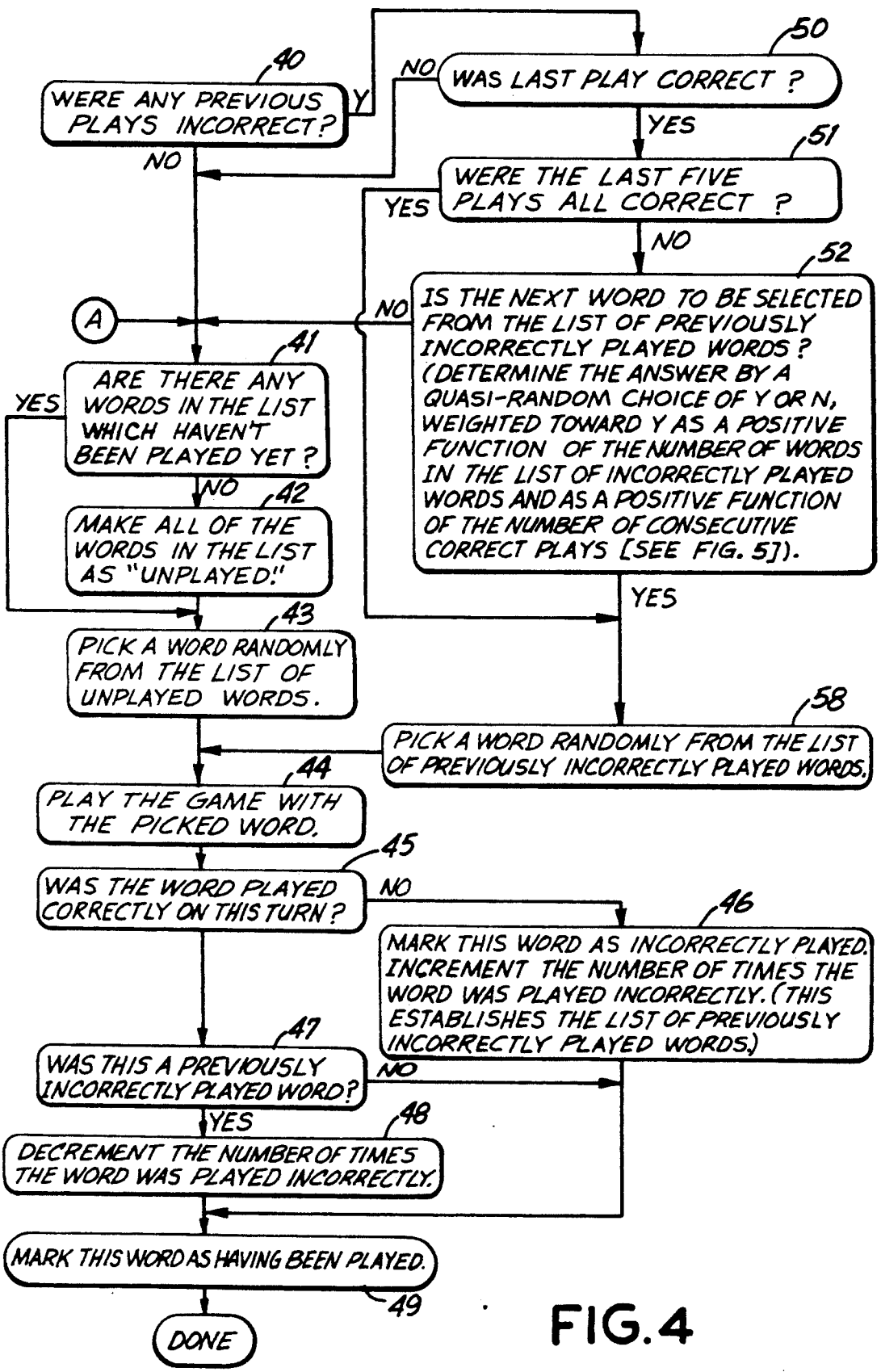
FIG. 4 is a flow chart illustrating the technique for selecting a word from the user list and is a more detailed illustration of the operation step 36 in FIG. 3.

FIG. 4 is a flow chart illustrating in greater detail the "almost-random" word selection from the user list; function step 36.

Decision step 40 determines if any of the previous plays of the particular game were correct or not. If all of the previous plays were correct (none incorrect) then decision step 41 determines if there are any words in the user list which haven't yet been played. If all have been played, then function step 42 marks each word in the user list as unplayed so that the list can be run through again. But if there are words which have not been played from the user list, then function step 43 picks one of those words randomly and the turn of the game is played as indicated at function step 44.

Decision step 45 determines if that word has been played correctly. If it was played incorrectly, function step 46 marks the word as having been incorrectly played. This provides a count of the number of the times the word was played incorrectly and establishes a list of previously incorrectly played words. If however the word was played correctly, decision step 47 determines if it had earlier been played correctly or incorrectly. If the word had been earlier played incorrectly, then function step 48 reduces the count by one and if the count is reduced to zero effectively removes this recently correctly played word from the list of incorrectly played words. In either case, the word that has just been played is so marked as having been played at function step 49.

Going back to decision step 40, if any of the previous play were incorrect (i.e. answer "yes" at step 40), then decision step 50 determines if the immediately preceding play was correct. If not (that is, if it was incorrect) then the selection procedure discussed above (commencing at decision step 41 is undertaken). The reason for this is to avoid selecting a previously incorrectly played word on the next turn. This minimizes having two or more incorrect plays and minimizes discouragement and provides some reinforcement.

However, if the last play was correct (step 50) and there were earlier incorrect plays (step 40) a routine is undertaken to select a word either from the list of previously incorrectly played words (the step 46 list) or from the list of unplayed words. The list selection is made on a quasi-random, weighted basis as shown in greater detail in FIG. 5. As a threshold matter, as shown at decision step 51, if the last five plays were all correct, then the list choice process forces a word selection from the list of previously incorrectly played words (step 58). Thus a player who has been playing well is forced to play a word he or she had earlier played wrong.

But between the situation of (a) the last play incorrect—No at step 50 and (b) the last five plays all correct—Yes at step 51, there is a situation where the weighted quasi-random list choice process of step 52 is undertaken.

Figure 5:
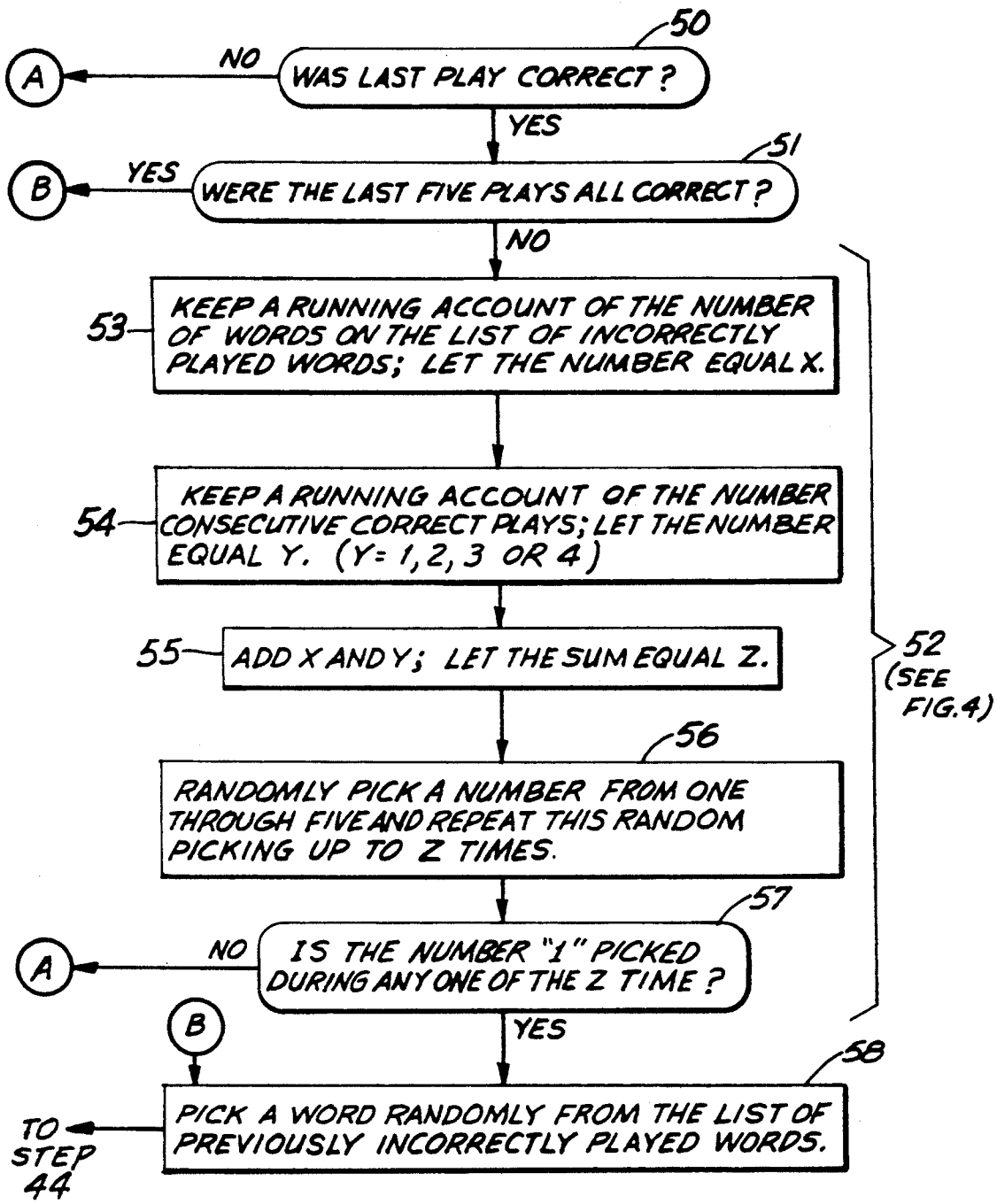
FIG. 5 is a flow chart illustrating the determination of whether to select a word from the list of incorrectly played words or from the list of unplayed words.

The function indicated at step 52 is essentially performed in the following fashion, as best shown in FIG. 5. A running account is kept of the number of words on the list of previously incorrectly played words. This is essentially a count of the number of words on the list created at step 46. As indicated at step 53, this number can be represented by X. As shown at step 54 a running account is also kept of the number of consecutive correct plays. Because of the functions of steps 50 and 51 this number is between 1 and 4. As indicated at step 54 this number can be represented by "Y". The two numbers "X" and "Y" are added to provide a sum equal to "Z" (see step 55). Then as indicated at step 56, a number from 1 through 5 is randomly picked. This random selection of a number 1 through 5 is repeated Z times. This is like throwing a five sided die "Z" times. If the number "1" comes up on any of these throws of the five sided die, then, as indicated at decision step 57, the selection process of step 58 is undertaken. That is, if the number "1" comes up during any one of the "Z" throws, a word is picked randomly from the list of previously incorrectly played words. If the number "1" does not come up on any of those throws, then the routine of selecting words from the unplayed list, which starts at step 41, is undertaken.

It might be noted that the number "Z" can be anything from "1" to a fairly substantial number equal to as much as "4" plus the number of word on the list of incorrectly played words. The greater the number Z, the greater the probability that a "1" will come up on any one of the random "throws" of step 56. Thus, the chance of picking a word from the list of previously incorrectly played words is increased as a positive function of the number of words on the list of incorrectly played words and as a positive function (up to the number 4) of the number of consecutive correct plays.

Thus if there is a large number of words on the incorrectly played word list, there is a very high chance that after each correctly played word, a word will be selected from the incorrectly played word list.

Figure 6:
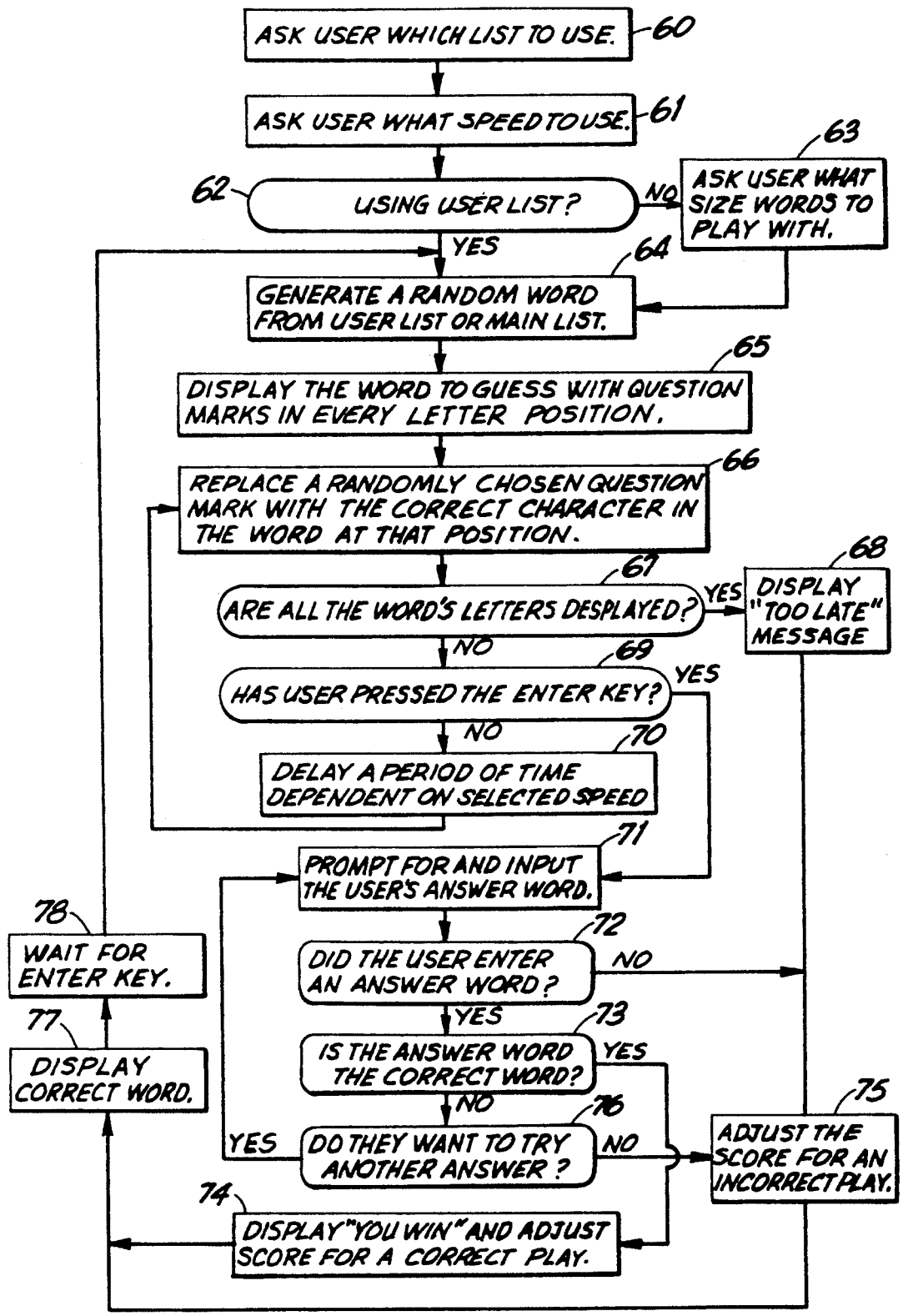
FIG. 6 is a flow chart indicating the programming of one of the games that can be played with this device.

FIG. 6 is a flow chart indicating the programming of the Wordblaster game. The functions at steps 60, 61 and 63 ask the user to select either the main list or the user list, to select a speed and, if the main list is used, ask the user to determine what size word should be selected from the main list. These three user options are effected by an appropriate legend on the display 11 which the user can vary by using the Scroll keys 16A, 16B and can select by using the Enter key 18. Thus function 61 is performed by displaying "SPEED? . . . 5" on the display 11. Scroll keys 16 are used to select a speed of anywhere from "1" to "10" and the desired speed is effected by pressing the Enter key. A comparable operation is provided for function 63 by displaying the legend "WORD SIZE? . . . 6" and scrolling up and down from there.

It should be noted that if the user list is employed, the user does not select the word size because that would limit the user list too much. With the appropriate list selected, then as indicated at function step 64 a word is generated at random from either the user list or the main list, with a constraint on the main list being the size of the word previously selected at step 63. Then as indicated at function step 65 a question mark is displayed on the screen for each letter position in the randomly selected word from the list being employed. As indicated at step 66, the correct character for randomly chosen positions in the word is automatically inserted by the machine at the rate determined by step 61.

If during this character placement process of step 66, the user determines that he or she can guess at what the word is by filling in the rest of the letters, the user then presses the Enter key 18 (step 69) which clears the display 11 and permits the user to type in the user's guess. After the user's guess is typed in, the user then again presses the Enter key 18 and, as indicated at step 71, the user's answer is input and if that is the correct word (decision step 73) the display "YOU WIN" is presented and a score for correct play entered. In addition, the correct word is displayed (step 77) until the Enter key is hit again at which point (step 78) a new word is randomly selected for the process to repeat.

If, however, the user lets the time elapse such that all the word's letters are automatically inserted by the machine (one at a time at the rate set in step 61) then as indicated at steps 67 and 68, the display 11 indicates "TOO LATE" and the score is adjusted for an incorrect play (step 75).

If the user fails to enter any word or does hit the Enter key without any letter appearing on the display, then as indicated at steps 72 and 75 the score is adjusted for an incorrect play. If the user enters an answer word correctly (step 73), the display 11 indicates "YOU WIN" and the score is adjusted for a correct play (step 74). If at step 72, an answer word is entered by the user but it is not correct step 73), then the display 11 will indicate "No, another? ". By pressing the Enter key 18, the user answers No to the step 76 decision and the score is adjusted for an incorrect play (step 75). If the user wishes to try another answer for the same game word, the user types in the other word and thus answers "yes" at the decision step 76.

What is claimed is:

1. An electronic language skills teaching aid machine comprising:
   user list memory means,
   entry means to permit a user to enter user selected terms into said user list memory means to provide a user determined list of terms,
   at least one predetermined user controlled function means for operating on terms selected from said user list of terms,
   selection means to select one of said terms from said user list of terms for use with said user controlled function means,
   error memory means to record user error for each of said terms in said user list when selected by said selection means and processed by said user controlled function means, and
   bias means to bias said selection means as a function of the frequency with which terms are incorrectly processed by the user controlled function as indicated by said error memory means.

2. The machine of claim 1 wherein:
   said user list includes a sub-list of terms for which user error is recorded by said error memory means, said bias means being positively correlated to the number of terms on said sub-list to bias selection toward said sub-list as contrasted with the entire user list.

3. The machine of claim 2 wherein said user controlled function means is a game means in said machine to provide the user with at least one predetermined word game employing terms from said user list.

4. The machine of claim 1 wherein said user controlled function means is a game means in said machine to provide the user with at least one predetermined word game employing terms from said user list.

5. A system to aid in the teaching of language skills comprising:
   an electronic spelling corrector means having a main list of terms in memory to compare an entered term against said list in memory and to provide an indication that the entered term is a validly spelled term and, if the entered term is not a validly spelled term, to provide a set of terms from said main list which may correspond to the entered term, and user list memory means,
   entry means to permit a user to enter user selected terms into said user list memory means to provide a user determined list of terms,
   at least one predetermined user controlled function means for operating on terms selected from said main list of terms or said user list of terms,
   user controlled pre-selection means to permit the user to select either said main list of terms or said user list of terms for use with said user controlled function means, and
   selection means to select one of said terms in the one of said list of terms selected by said pre-selection means for use with said user-controlled function means.

6. The machine of claim 5 wherein said entry means comprises:
   enter means actuated by the user to provide an indication that a user selected term is to be entered into said user list,
   comparison means to compare said user selected term with said set of terms in said main list in memory to provide an indication of whether said user selected term corresponds to a term in said main list, and
   user actuated confirmation means to confirm that a user selected term that is not in said main list is to be placed in said user list.

7. The machine of claim 6 further comprising:
   error memory means to record user error for each of said terms in said user list when selected by said selection means and processed by said user controlled function means, and
   bias means to bias said selection means as a function of the frequency with which terms are incorrectly processed by the user controlled function as indicated by said error memory means.

8. The machine of claim 7 wherein:
   said user list includes a sub-list of terms for which user error is recorded by said error memory means,
   said bias means being positively correlated to the number of terms on said sub-list to bias selection toward said sub-list as contrasted with the entire user list.

9. The machine of claim 8 wherein said user controlled function means is a game means in said machine to provide the user with at least one predetermined word game employing terms from the one of said list of terms selected by said pre-selection means.

10. The machine of claim 7 wherein said user controlled function means is a game means in said machine to provide the user with at least one predetermined word game employing terms from the one of said list of terms selected by said pre-selection means.

11. The machine of claim 10 further comprising:
a locating indicia associated with each of said terms in said main list, said locating indicia indicating location in a companion book where a definition or meaning of the term may be found.

12. The machine of claim 7 further comprising:
a locating indicia associated with each of said terms in said main list, said locating indicia indicating location in a companion book where a definition or meaning of the term may be found.

13. The machine of claim 6 wherein said user controlled function means is a game means in said machine to provide the user with at least one predetermined word game employing terms from the one of said list of terms selected by said pre-selection means.

14. The machine of claim 6 further comprising:
a locating indicia associated with each of said terms in said main list, said locating indicia indicating location in a companion book where a definition or meaning of the term may be found.

15. The machine of claim 5 further comprising:
error memory means to record user error for each of said terms in said user list when selected by said selection means and processed by said user controlled function means, and
bias means to bias said selection means as a function of the frequency with which terms are incorrectly processed by the user controlled function as indicated by said error memory means.

16. The machine of claim 15 wherein:
said user list includes a sub-list of terms for which user error is recorded by said error memory means,
said bias means being positively correlated to the number of terms on said sub-list to bias selection toward said sub-list as contrasted with the entire user list.

17. The machine of claim 5 wherein said user controlled function means is a game means in said machine to provide the user with at least one predetermined word game employing terms from the one of said list of terms selected by said preselection means.

18. The machine of claim 5 further comprising:
a locating indicia associated with each of said terms in said main list, said locating indicia indicating location in a companion book where a definition or meaning of the term may be found.

* * * * *